(12) United States Patent
Torosyan

(10) Patent No.: US 11,088,411 B2
(45) Date of Patent: Aug. 10, 2021

(54) APPARATUS AND METHOD FOR HOLDING CIRCUIT AGAINST BATTERY MODULE

(71) Applicant: Faraday & Future Inc., Gardena, CA (US)

(72) Inventor: Hrayr Torosyan, Sunland, CA (US)

(73) Assignee: Faraday & Future Inc., Gardena, CA (US)

( * ) Notice: Subject to any disclaimer, the term of this patent is extended or adjusted under 35 U.S.C. 154(b) by 39 days.

(21) Appl. No.: 15/942,314

(22) Filed: Mar. 30, 2018

(65) Prior Publication Data

US 2019/0326572 A1  Oct. 24, 2019

Related U.S. Application Data

(60) Provisional application No. 62/479,243, filed on Mar. 30, 2017.

(51) Int. Cl.
| | |
|---|---|
| *H01M 2/10* | (2006.01) |
| *H01M 4/00* | (2006.01) |
| *H01M 50/20* | (2021.01) |
| *B23K 26/21* | (2014.01) |
| *H01M 50/502* | (2021.01) |
| *B23K 101/36* | (2006.01) |

(52) U.S. Cl.
CPC ............. *H01M 50/20* (2021.01); *B23K 26/21* (2015.10); *H01M 50/502* (2021.01); *B23K 2101/36* (2018.08)

(58) Field of Classification Search
None
See application file for complete search history.

(56) References Cited

U.S. PATENT DOCUMENTS

| | | | | |
|---|---|---|---|---|
| 2006/0255764 A1* | 11/2006 | Cho | ..................... | H01M 2/1077 320/116 |
| 2014/0212696 A1* | 7/2014 | Cho | ..................... | H01M 2/1022 429/7 |
| 2017/0077487 A1* | 3/2017 | Coakley | ................ | H01M 2/202 |

\* cited by examiner

*Primary Examiner* — Cynthia H Kelly
*Assistant Examiner* — Julian Anthony
(74) *Attorney, Agent, or Firm* — Knobbe Martens Olson & Bear LLP

(57) ABSTRACT

An apparatus for holding a circuit against a battery module includes a set of first fixtures for holding a set of first tabs of the circuit against a corresponding set of positive terminals of the battery module, a set of second fixtures for holding a set of second tabs of the circuit against a corresponding set of negative terminals of the battery module, and a rigid plate having a set of openings therein for receiving the set of first fixtures and the set of second fixtures, the rigid plate configured for mounting to a structure holding the battery module.

17 Claims, 12 Drawing Sheets

APPARATUS AND METHOD FOR HOLDING CIRCUIT AGAINST BATTERY MODULE

CROSS-REFERENCE TO RELATED APPLICATIONS

This application claims the priority benefit of U.S. Provisional Application No. 62/479,243, filed Mar. 30, 2017, the entirety of which is hereby incorporated by reference.

TECHNICAL FIELD

The present disclosure relates generally to an apparatus and method of welding interconnecting circuitry to a battery module for a vehicle and, more particularly, to an apparatus and method of holding a circuit, for interconnecting battery cells, against a vehicle battery module during welding of the circuit to the vehicle battery module.

BACKGROUND

Battery-powered vehicles, such as electric vehicles or hybrid electric vehicles, contain one or more high-voltage battery packs. The one or more high-voltage battery packs are used as a primary power source of a vehicle to drive various primary loads (e.g., traction motors) and various auxiliary loads (e.g., HVAC, lighting, pumps, etc.). A high-voltage battery pack may be configured to include one or more battery modules, with each battery module including a plurality of battery cells that are electrically interconnected with one another, either in series or in parallel. To ensure the proper function of a battery module, the plurality of battery cells of the battery module is required to be effectively electrically interconnected during the life span of the battery module. A flexible ("flex") or rigid circuit may be used to electrically interconnect the plurality of cells by welding the flex or rigid circuit to the battery module. The welding quality can affect the proper function of the battery module. For example, one or more gaps between the flex or rigid circuit and the battery module caused by deficient welding, could be detrimental to the performance of the battery module.

The apparatus and method disclosed herein are directed to addressing one or more of the problems set forth above and/or other problems in the prior art.

SUMMARY

One aspect of the present disclosure is directed to an apparatus for holding a circuit against a battery module. The apparatus may include a set of first fixtures for holding a set of first conductive tabs of the circuit against a corresponding set of positive terminals of the battery module. The apparatus may further include a set of second fixtures for holding a set of second conductive tabs of the circuit against a corresponding set of negative terminals of the battery module. In addition, the apparatus may include a rigid plate having openings therein for receiving the set of first fixtures and the set of second fixtures. The rigid plate is for mounting to a structure holding the battery module.

Another aspect of the present disclosure is directed to a method of holding a circuit against a battery module. The method may include providing a set of first fixtures for holding a set of first conductive tabs of the circuit against a corresponding set of positive terminals of the battery module, and providing a set of second fixtures for holding a set of second conductive tabs of the circuit against a corresponding set of negative terminals of the battery module. The method may further include providing a rigid plate having a set of openings therein for receiving the set of first fixtures and the set of second fixtures. Additionally, the method may include engaging the set of first fixtures and the set of second fixtures with the rigid plate such that each of the openings receives at least one of the first fixtures and the second fixtures. The method may further include disposing the rigid plate onto the circuit such that each of the set of first fixtures engages one of the set of first tabs to hold the one first tab against one corresponding positive terminal, and each of the set of second fixtures engages one of the set of second tabs to hold the one second tab against one corresponding negative terminal.

DETAILED DESCRIPTION

The disclosure is generally directed to an apparatus, and a method of using the apparatus, for holding a circuit against a battery module to facilitate welding the circuit to the battery module. The circuit as defined herein may include a flex circuit, a rigid circuit, or a rigid board. The circuit includes positive tabs (also referred to as first tabs described below) and negative tabs (also referred to as second tabs described below) for attachment by welding to the positive and negative terminals, respectively, of battery cells of the battery module. The positive and negative tabs are conductive tabs that are part of, and interconnected by, the circuit so that the tabs' connections to the positive and negative battery cells effects a desired interconnection of the respective cells of the battery module. The apparatus includes a set of first fixtures for holding a set of first tabs of the circuit against a corresponding set of positive terminals of the battery module, and a set of second fixtures for holding a set of second tabs of the circuit against a corresponding set of negative terminals of the battery module. The first and second fixtures may each perform like a spring when a force is exerted on them, thus individually bending one tab and holding the one tab that is bent, of the circuit against a corresponding battery cell terminal of the battery module to create a zero-gap between the one tab and one corresponding battery cell terminal. Zero-gap is used herein to characterize the contact between a bottom side of a tab of the circuit and the corresponding battery terminal as being direct physical contact sufficient to enable welding by directing a welding laser onto a top side of that tab. The zero-gap may significantly facilitate the welding of the circuit onto the battery module to improve the welding quality. The apparatus includes a rigid plate having a set of first structures therein for receiving the set of first fixtures and having a set of second structures therein for receiving the set of second fixtures. Further, upon the first and second fixtures being assembled into the rigid plate, the rigid plate determines the spacing and orientation of the first and second fixtures and exerts the force (e.g., a push force) against the first and second fixtures needed to bend the fixture and hold the tabs of the circuit in place.

Figure 1A:
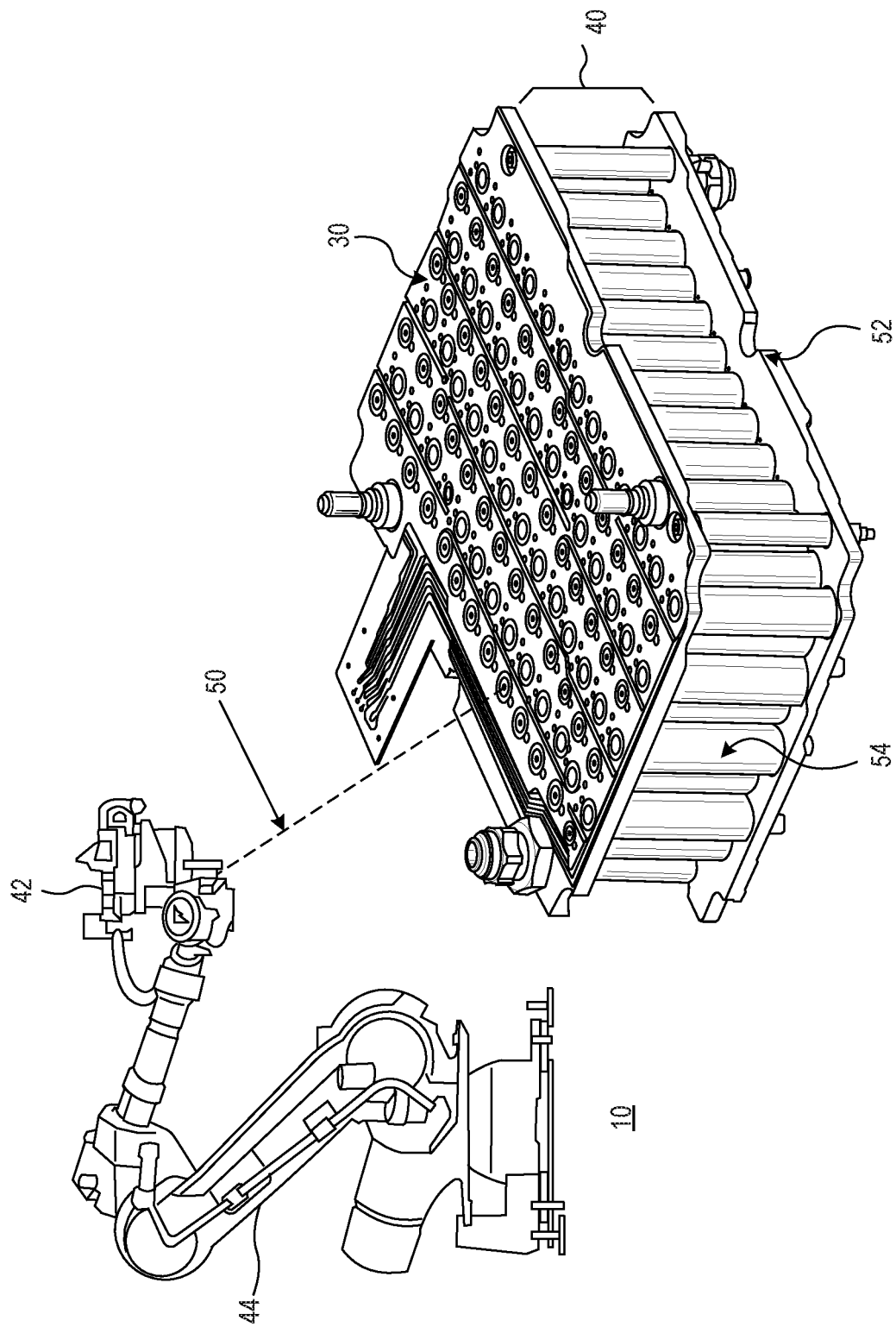
FIG. 1A is a diagrammatic illustration of an exemplary laser welding system, in which the apparatus and method of the present embodiment may be practiced.

FIG. 1A is a diagrammatic illustration of an exemplary laser welding system, in which the apparatus and method of the present embodiment may be practiced. The welding system includes a welding tool 10, a first workpiece 30, and a second workpiece 40. In the exemplary welding system of FIG. 1A, welding tool 10 includes laser 42 which acts as a heat source. Laser 42 is mounted to a robotic arm 44, which is configured to move laser 42 in multiple directions relative to first workpiece 30 and second workpiece 40.

Laser 42 may be configured to generate and direct one or more polarized laser beams 50 toward first workpiece 30 or second workpiece 40. Laser 42 may include, for example, one or more of an Excimer laser, a Yb:tunstates laser, a $CO_2$ laser, a Nd:YAG laser, a diode-pumped solid-state (DPSS) laser, or any other type of laser capable of heating workpieces to its welding temperature. In the disclosed embodiment, laser 42 is configured to produce laser beam 50 having a circular or square cross section, with a dimension (e.g., a diameter or width) that is proportional to a welded region. Laser 42 may also include a solid state laser, a gas laser, or a fiber laser.

First workpiece 30 is generally planar and provided as a circuit including positive and negative conductive tabs as described above. Second workpiece 40 is a battery module including a plurality of battery cells 54 (as will be described below in FIG. 1C). The battery module includes a support base 52 that provides mechanical support to, for example, the plurality of battery cells 54.

Figure 1B:
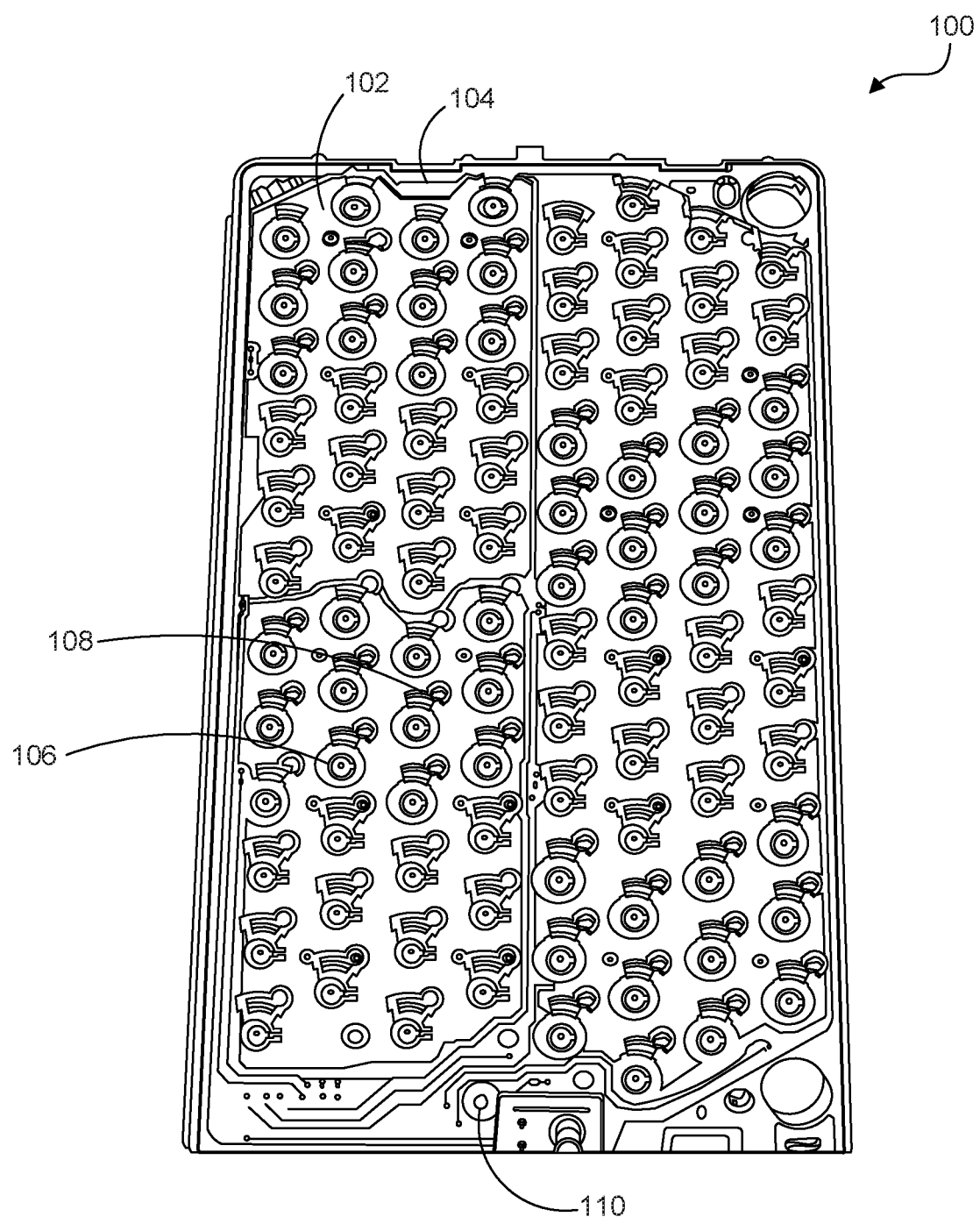
FIG. 1B is a schematic illustration of a top view of an exemplary circuit disposed on an exemplary battery module.

FIG. 1B is a schematic illustration of a top view 100 of an exemplary circuit 102 disposed on an exemplary battery module 104. In FIG. 1B, circuit 102 may or may not already be welded to battery module 104. Circuit 102 includes a set of first tabs 106 (also referred to as positive tabs herein) and a set of second tabs 108 (also referred to as negative tabs herein). Each of first tabs 106 may have a circular or round shape, and each of second tabs 108 may have a crescent or annular shape. Circuit 102 may also include a power bud 110 for connecting one side of battery module 104 to another side of battery module 104. Battery module 104 includes a plurality of battery cells such as shown in FIG. 1A. Each of the plurality of battery cells has a positive terminal and a negative terminal, such as will be shown in FIG. 1C. Upon welding of circuit 102 onto battery module 104, each of the set of first tabs of circuit 102 is physically and electrically connected to one corresponding positive terminal of one battery cell; and each of the set of second tabs of circuit 102 is physically and electrically connected to one corresponding negative terminal of one battery cell. Circuit 102 and battery module 104 may include further features and/or components that are not described herein.

Figure 1C:
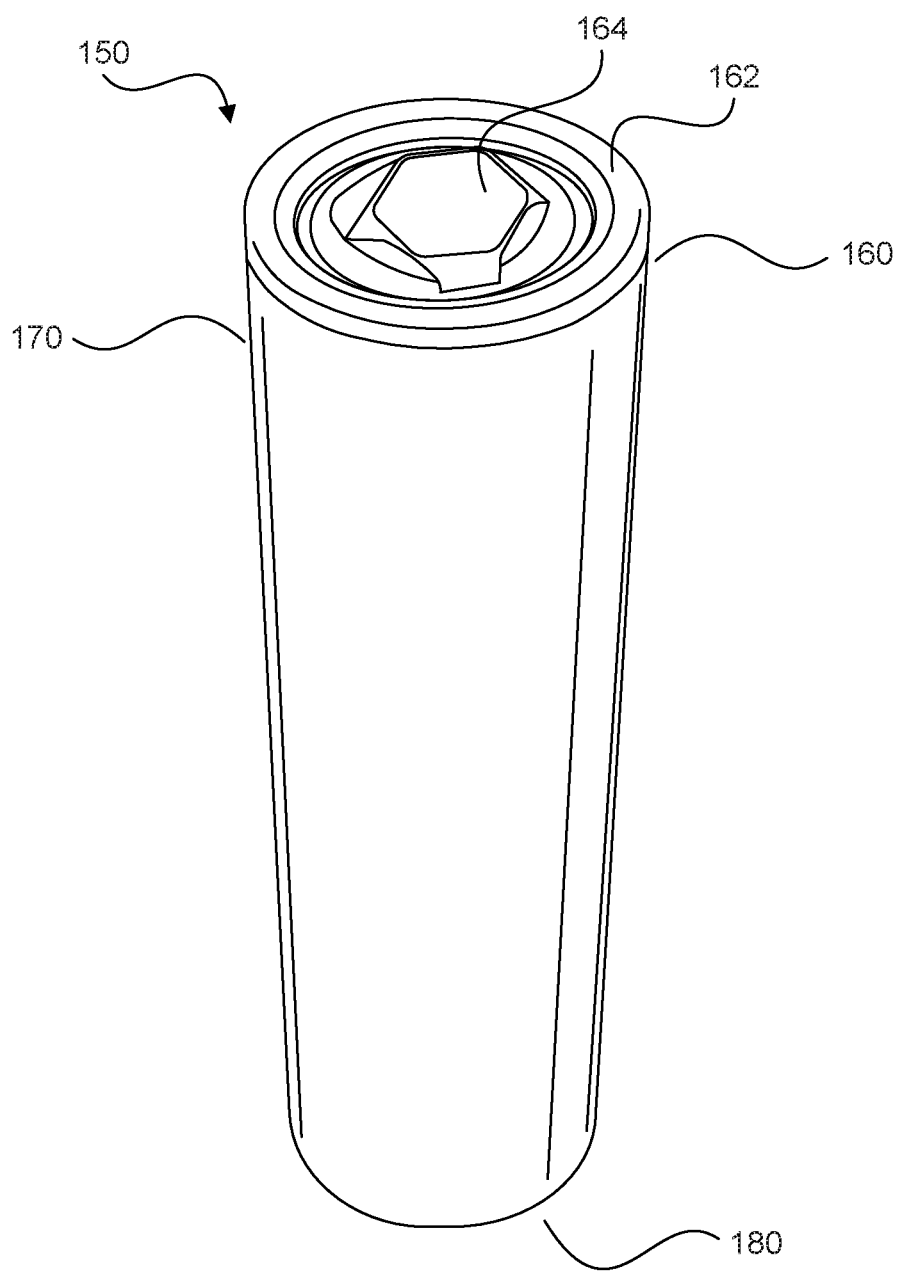
FIG. 1C is a schematic illustration of an exemplary battery cell positioned in the exemplary battery module of FIG. 1B.

FIG. 1C is a schematic illustration of an exemplary battery cell 150 positioned in the exemplary battery module of FIG. 1B. Battery cell 150 may be a lithium ion (li-ion) battery. For example, battery cell 150 may be an 18650 type battery having a cylindrical shape with an approximate diameter of 18.6 mm and approximate length of 65.2 mm. Other rechargeable battery form factors and chemistries may additionally or alternatively be used. In various embodiments, battery cell 150 includes a first end 160, a can 170 (e.g., the cylindrical body), and a second end 180. Both an anode terminal 162 and a cathode terminal 164 may be disposed on first end 160. Anode terminal 162 is a negative terminal of battery cell 150, and cathode terminal 164 is a positive terminal of battery cell 150. Anode terminal 162 and cathode terminal 164 are electrically isolated from each other by an insulator or dielectric.

Figure 2A:
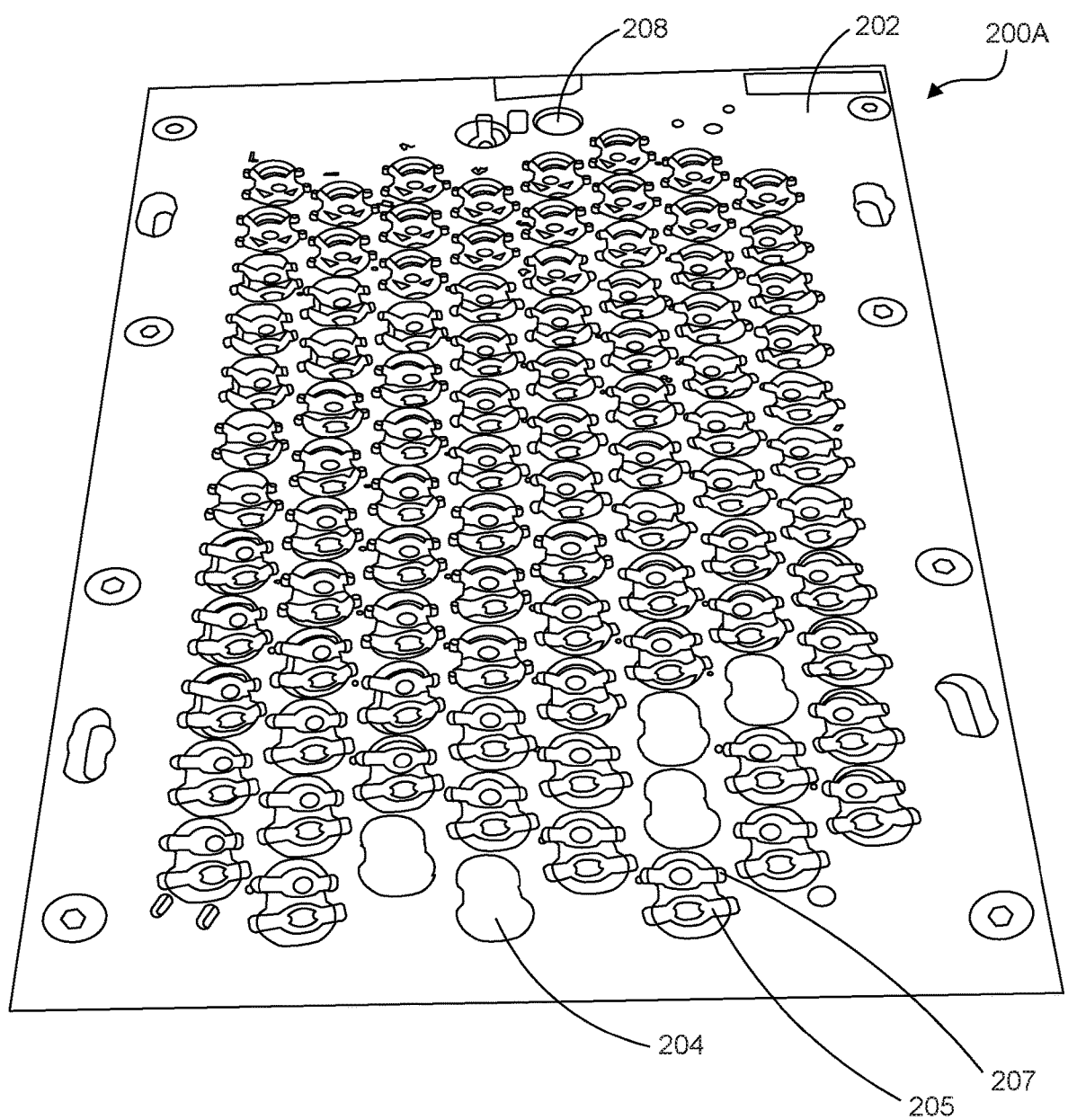
FIG. 2A is a schematic illustration of a top view of an exemplary rigid plate including a set of first structures and a set of second structures that may be used with the exemplary circuit of FIG. 1, according to an exemplary embodiment.

FIG. 2A is a schematic illustration of a top view 200A of an exemplary rigid plate 202 including a set of first structures and a set of second structures that may be used with the exemplary circuit of FIG. 1B, according to an exemplary embodiment of the disclosure. Rigid plate 202 includes a plurality of openings 204 each for receiving a first fixture 205 and a second fixture 207. Openings 204 are configured to be spatially distributed in plate 202. As illustrated in FIG. 2A, first fixture 205 and second fixtures 207 are mounted in most openings 204, while several openings 204 are shown without fixtures 205,207 mounted therein, for illustrative purposes. Various embodiments of first fixture 205 and second fixture 207 will be described below.

Rigid plate 202 may also include alignment features, for example, one or more holes or slots 208 used to align rigid plate 202 with respect to a battery module (e.g., battery module 104 in FIG. 1B). Rigid plate 202 may have a shape and dimensions (e.g., length and width) that corresponds to a shape and dimensions of a circuit upon which rigid plate 102 may be positioned (e.g., circuit 102 in FIG. 1B). Further, rigid plate 202 may be constructed of any suitable material including, but not limited to, steel, stainless steel, aluminum, iron, copper and/or bronze that is able to provide a desired rigidity. Rigid plate 202 may have a thickness that may be selected depending on the material of which rigid plate 202 is constructed. Rigid plate is further configured to be attached to a structure holding the battery module, such as support base 52 in FIG. 1A, in order to be clamped against and exert a force on circuit 102. Rigid plate 202 may include further features and/or components that are not described herein.

Figure 2B:
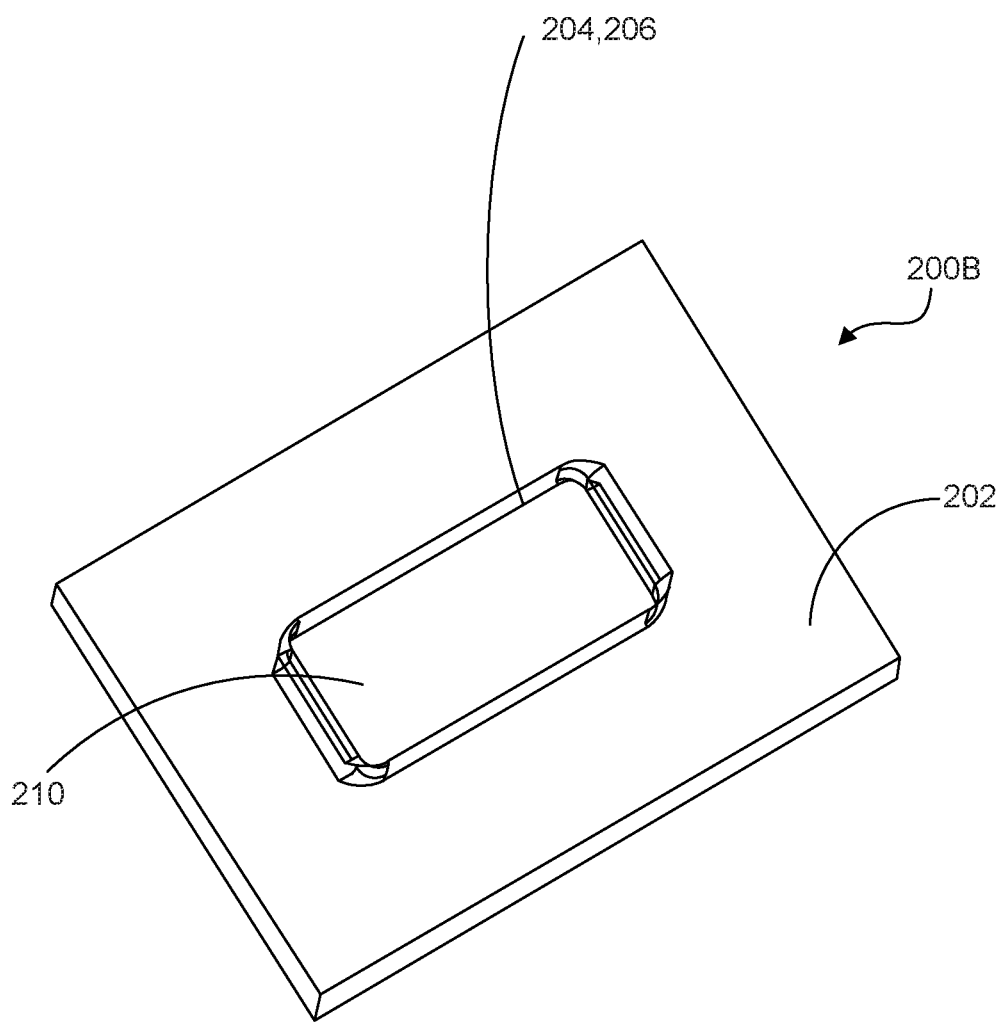
FIG. 2B is a schematic illustration of a perspective view of an exemplary first structure in FIG. 2A.

FIG. 2B is a schematic illustration of a perspective view 200B of an exemplary opening 204 in FIG. 2A. As illustrated in FIG. 2B, opening 204 includes an aperture 210 having a rectangular shape. In some embodiments, opening 204 may be configured to have any shape that is different from a rectangle. Opening 204 is also referred to herein as a first structure 204 for having mounted therein, at least, one of first fixtures 205. In some embodiments, rigid plate 202 is constructed to provide separate openings for mounting second fixtures 207, such separate openings are referred to herein as second structures 206. Accordingly, the opening in FIG. 2B is designated 204,206 to indicate it is configured to receive either first fixture 205 or second fixture 207. Also, as described above, opening 204 may be configured to receive both fixtures 205 and 207, and thereby include both first structure 204 and second structure 206. In some embodiments, openings configured to receive both fixtures may alternate with openings configured to receive one of first and second fixtures. As indicated in FIG. 2B, second structure 206 may have the same or similar structure as first structure 204, that is, second structure 206 may include an aperture (not shown) having a rectangular shape. However, in some embodiments, second structure 206 may be configured to have any shape that is different from a rectangle. Further in some embodiments, first structure 204 and second structure 206 may be configured to have different shapes and dimensions (e.g., length, width, and/or thickness), which may depend on a configuration of a circuit upon which rigid plate 202 is to be positioned. The configuration of a circuit may include the shape and dimension of the set of first tabs 106 and the shape and dimension of the set of second tabs 108.

Figure 3A:
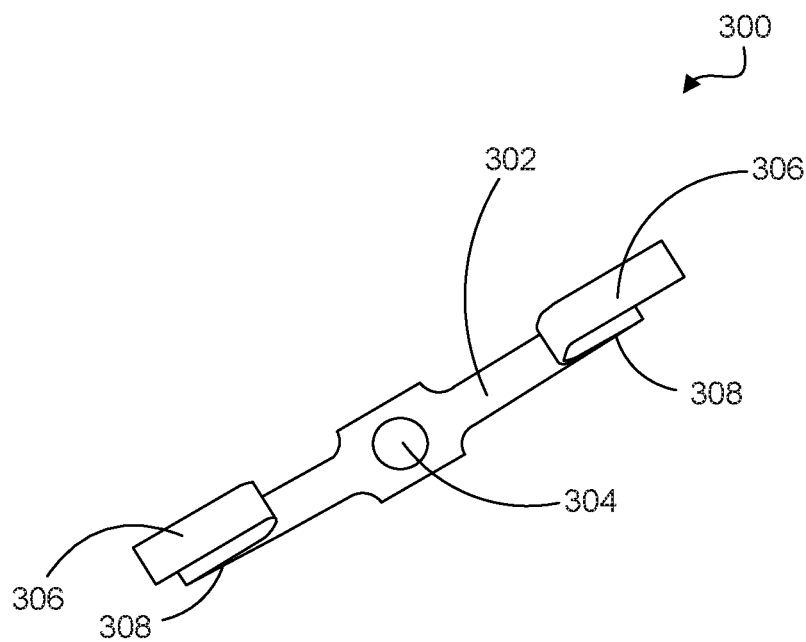
FIG. 3A is a schematic illustration of a perspective view of an exemplary first fixture that may be used with the exemplary rigid plate in FIG. 2A, according to an exemplary embodiment.

FIG. 3A is a schematic illustration of a perspective view of an exemplary first fixture 300 that may be used with the exemplary rigid plate 202 in FIG. 2A, according to an exemplary embodiment. First fixture 300 includes a body 302, an aperture or hole 304, a pair of hold-in-place tabs 306, and a pair of spring features 308 that may be a portion of body 302. Aperture 304 is configured to be substantially centered in body 302 and have a circular or round shape that allows a laser beam to pass through for welding one of first tabs of circuit 102 to one corresponding positive terminal of a battery cell in battery module 104. In some embodiments, aperture 304 may be configured to have any shape and/or any size that allows the laser beam not to be blocked. Tabs 306 are configured to connect to spring features 308 and further configured to snap first fixture 300 into one of first structures 204 and to hold first fixture 300 in place so as not to allow first fixture 300 to fall out of rigid plate 202. Spring features 308 are configured to engage rigid plate 202 and allow first fixture 300 to flex through a distance sufficient to exert a force on and hold first tab 106 in place against one corresponding positive terminal of a battery cell in a battery module (e.g., battery module 104), so there is a zero-gap between first tab 106 and the corresponding positive terminal. Further, tabs 306 may allow easy installation and removal of spring features 308. Additionally, spring features 308 may be configured to allow first fixture 300 to revert to its original state.

In some embodiments, aperture 304 may be configured to conform to a shape and/or dimension of first tab 106 of circuit 102. For example, aperture 304 may be configured to conform to a circular shape of first tab 106 to ensure even distribution of force and surface contact.

Figure 3B:
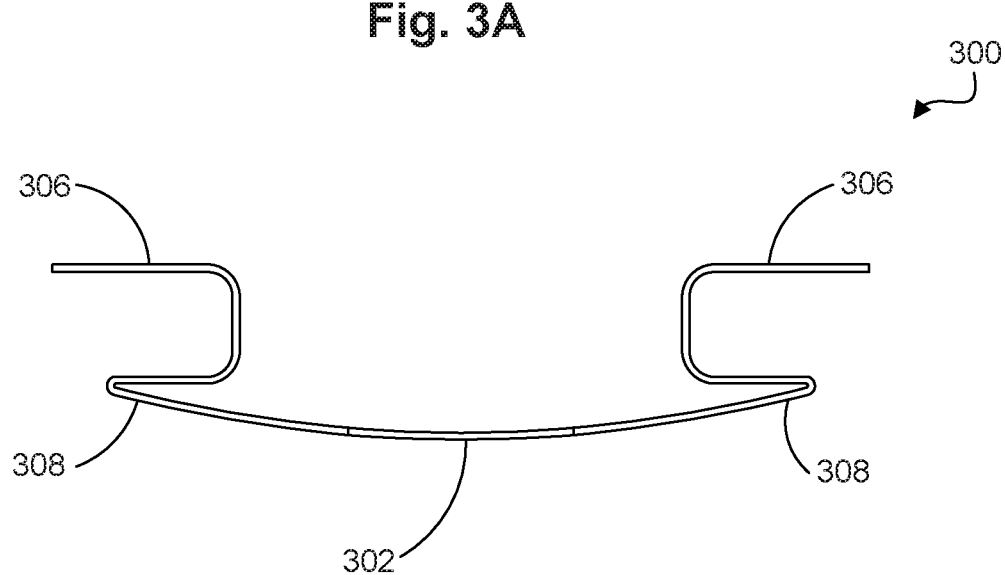
FIG. 3B is a schematic illustration of a cross-sectional view of the exemplary first fixture in FIG. 3A.

FIG. 3B is a schematic illustration of a cross-sectional view of the exemplary first fixture in FIG. 3A. As illustrated in FIG. 3B, body 302 may be configured to have a convex curved structure that contacts with one of first tabs 106 and pushes the one of first tabs 106 against one corresponding positive battery terminal. The convex curved structure allows a spring action to be performed when rigid plate 202 is placed in its final clamping position. Further, the curved structure may allow flattening out of the first tabs of the circuit as the rigid plate comes to its final clamping position.

The material of which first fixture 300 is formed may be selected based on the particular application of first fixture 300. In this exemplary embodiment, the material may be selected to withstand high temperatures experienced during laser beam welding and exhibit spring-like characteristics. For example, first fixture 300 may be formed of an elastic material that withstands a temperature at least as high as a predetermined temperature (e.g., a melting temperature of the elastic material). For example, a fixture made of steel (having a melting temperature of, e.g., about 1510 degrees Celsius) may withstand the melting temperature of copper, at about 1085 degrees Celsius, that may be used to form tabs of circuit 102. Alternatively, the fixtures may be made of any steel, having a suitably high melting point, that would provide a spring force, such as spring steel, stainless steel (having a melting point of about 2000 degrees F.) or steel that is tempered or work hardened. Further alternatively, the fixtures may be made of plastic (such as PEEK or higher temperature plastics) that can withstand the laser power during a welding process. The selection of the material for the fixtures may depend on the amount of force required to be generated during clamping and what localized temperatures the fixtures will experience during a laser welding operation. In some embodiments, spring features 308 may be modified to allow for a larger or smaller spring force based on the particular application of first fixture 300.

Figure 4A:
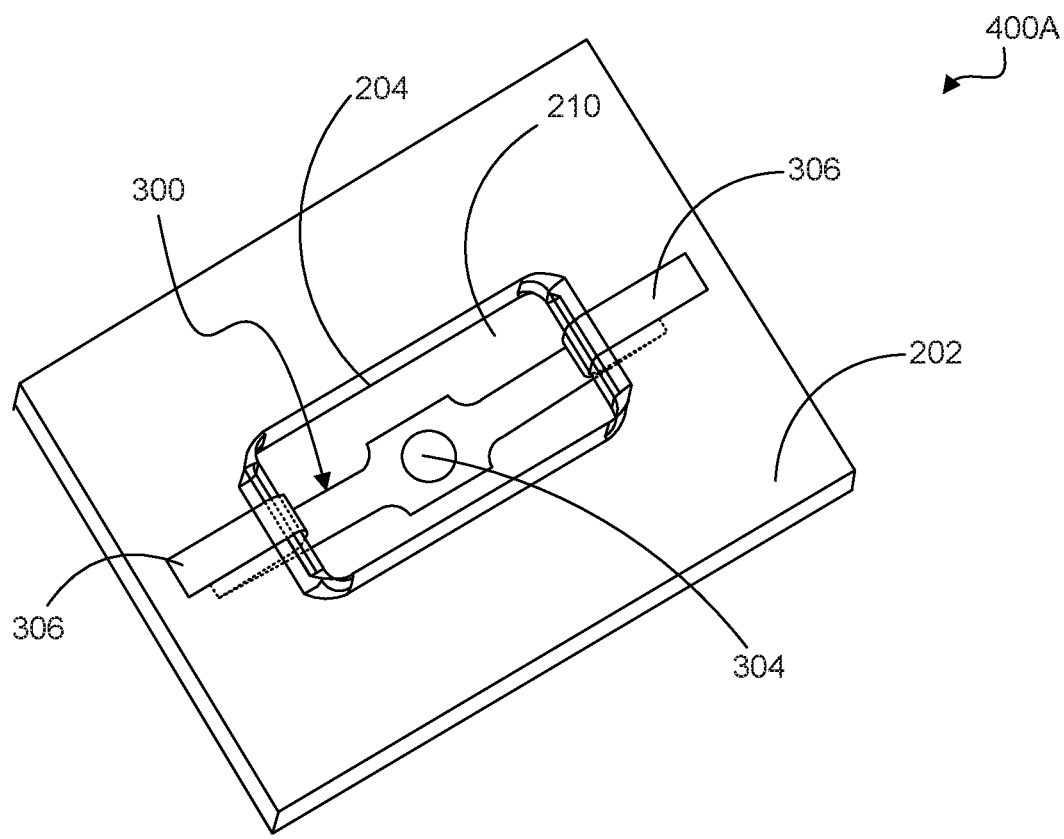
FIG. 4A is a schematic illustration of a perspective view of the exemplary first fixture engaged with one of the first structures of the exemplary rigid plate in FIG. 2A.

FIG. 4A is a schematic illustration of a perspective view 400A of exemplary first fixture 300 engaged with one of first structures 204 of rigid plate 202. As shown in FIG. 4A, first fixture 300 is installed/received in one of first structures 204 of rigid plate 202. Hold-in-place tabs 306 engage a portion of a top surface of rigid plate 202 that provides a landing surface for hold-in-place tabs 306 to engage and prevent hold-in-place tabs 306 from rotating or moving from their intended positions. Spring features 308 engage a portion of a bottom surface of rigid plate 202 that provides a landing surface for spring features 308 to engage and prevent spring features 308 from rotating or moving from their intended positions. Further, the bottom surface of rigid plate 202 may provide a space for spring features 308 to extend outward upon a push/compress force being transferred to first fixture 300 from rigid plate 202, thus pushing body 302 down on one corresponding first tab to hold the one corresponding first tab against one corresponding positive terminal of the battery cell. A laser beam may pass through aperture 304 for welding together the one corresponding first tab and the one corresponding positive terminal of the battery module while the one corresponding first tab is held against the one corresponding positive terminal of the battery with a zero-gap there between.

Figure 4B:
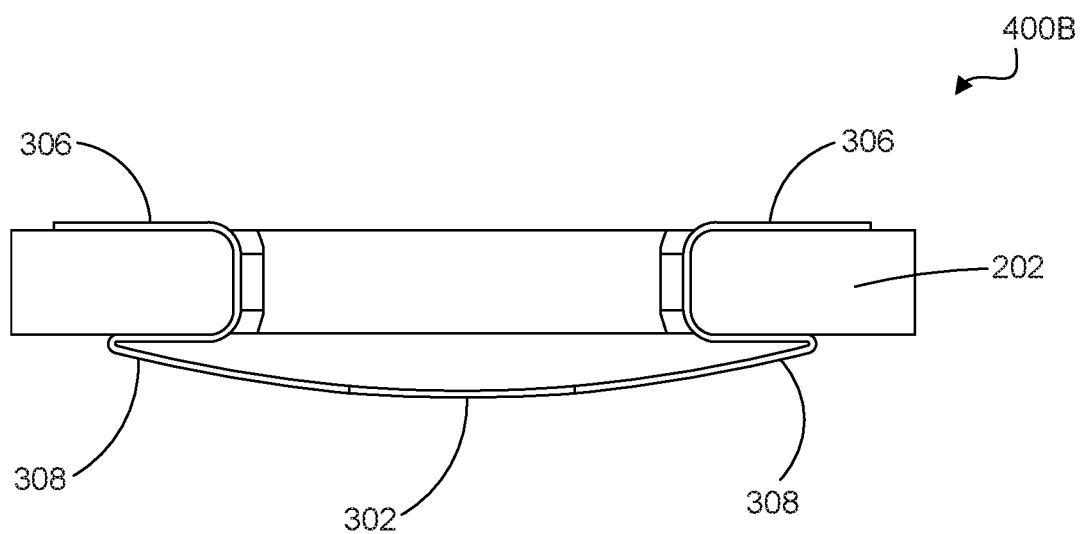
FIG. 4B is a schematic illustration of a cross-sectional view of the exemplary first fixture engaged with one of the first structures of the exemplary rigid plate in FIG. 4A.

FIG. 4B is a schematic illustration of a cross-sectional view 400B of the exemplary first fixture 300 engaged with one of the first structures 204 of exemplary rigid plate 202 in FIG. 4A. As illustrated in FIG. 4B, tabs 306 engage a portion of the top surface of rigid plate 202, and spring features 308 engage a portion of the bottom surface of rigid plate 202.

Figure 5A:
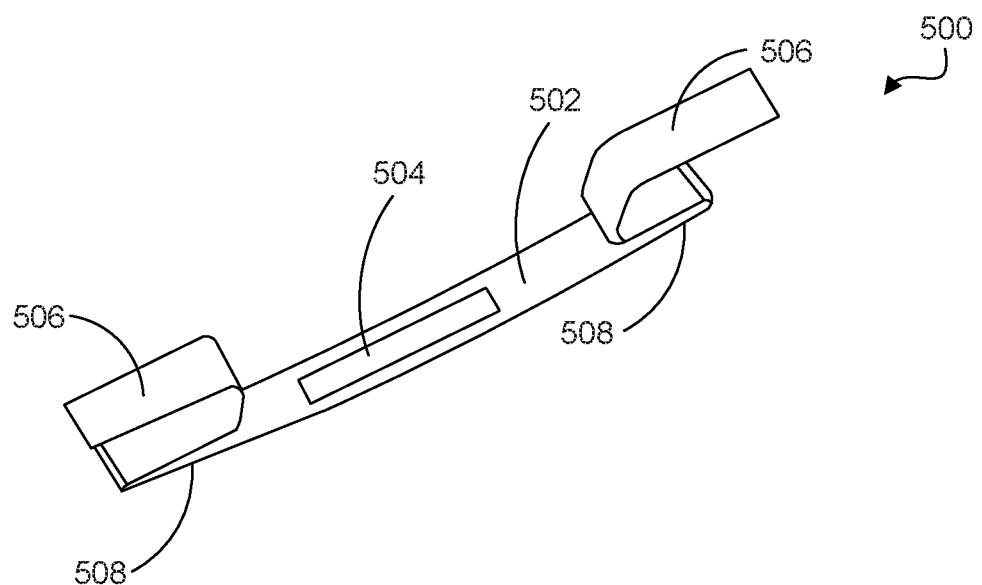
FIG. 5A is a schematic illustration of a perspective view of an exemplary second fixture that may be used with the exemplary rigid plate in FIG. 2A, according to an exemplary embodiment.

FIG. 5A is a schematic illustration of a perspective view of an exemplary second fixture 500 that may be used with exemplary rigid plate 202 in FIG. 2A, according to an exemplary embodiment. Second fixture 500 includes a body 502, an aperture or hole 504, a pair of hold-in-place tabs 506, and a pair of spring features 508 that may be a portion of body 502. Aperture 504 is configured to be substantially centered in body 502 and have a rectangular or square shape that allows a laser beam to pass through for welding one of second tabs of circuit 102 to one corresponding negative terminal of a battery cell in battery module 104. In some embodiments, aperture 504 may be configured to have any shape and/or any size that allows the laser beam not to be blocked. Tabs 506 are configured to connect to spring features 508 and further configured to snap first fixture 500 into one of second structures 206 and to hold second fixture 500 in place so as not to allow second fixture 300 to fall out of rigid plate 202. Spring features 508 are configured to engage rigid plate 202 and allow second fixture 500 to flex through a distance sufficient to hold second tab 108 in place against one corresponding negative terminal of a battery cell in a battery module (e.g., battery module 102), so there is a zero-gap between second tab 108 and the corresponding negative terminal. Further, tabs 506 may allow easy installation and removal of spring features 508. Additionally, spring features 508 may be configured to allow second fixture 500 to revert to its original state.

In some embodiments, aperture 504 may be configured to conform to a shape and/or dimension of second tab 108 of circuit 102. For example, aperture 504 may be configured to conform to a crescent shape of second tab 108 to ensure even distribution of force and surface contact.

Figure 5B:
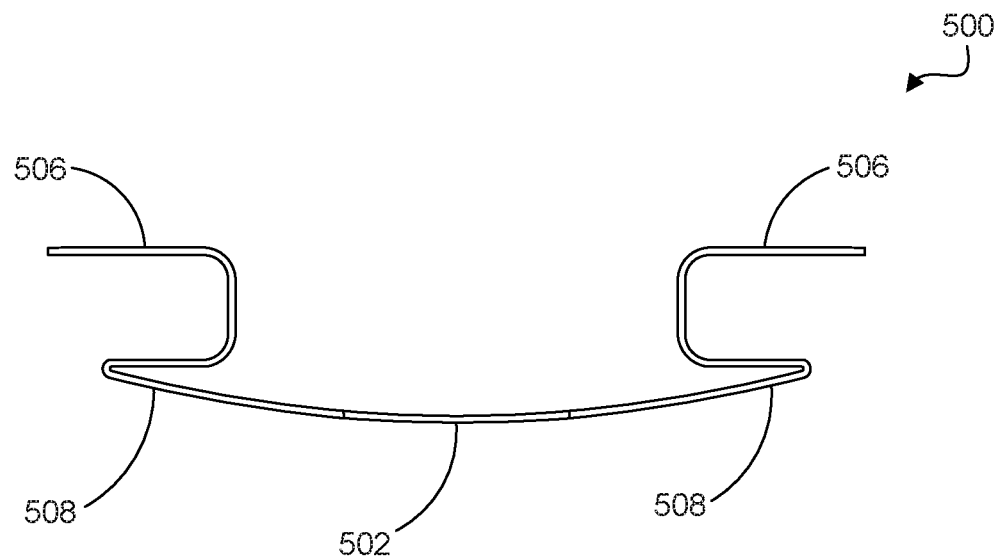
FIG. 5B is a schematic illustration of a cross-sectional view of the exemplary second fixture in FIG. 5A.

FIG. 5B is a schematic illustration of a cross-sectional view of the exemplary second fixture 500 in FIG. 5A. As illustrated in FIG. 5B, body 502 may be configured to have a convex curved structure that contacts with one of second tabs 108 and pushes the one of second tabs 108 against a corresponding negative battery terminal. The convex curved structure allows a spring action to be performed when rigid plate 202 is placed in its final clamping position. Further, the curved structure may allow flattening out of the second tabs of the circuit as the rigid plate comes to its final clamping position.

The material of which second fixture 500 is formed may be selected based on the particular application of second fixture 500. In this exemplary embodiment, the material may be selected to withstand high temperatures experienced during laser beam and exhibit spring-like characteristics. For example, second fixture 500 may be formed of an elastic material that withstands a temperature at least as high as a predetermined temperature, (e.g., a melting temperature of the elastic material). For example, a fixture made of steel (having a melting temperature of, e.g., about 1510 degree Celsius) may withstand the melting temperature of copper at 1085 degrees Celsius. Alternatively, the fixtures may be made of any steel, having a suitably high melting point, that would provide a spring force, such as spring steel, stainless steel or steel that is tempered or work hardened. Further alternatively, the fixtures may be made of plastic (such as PEEK or higher temperature plastics) that can withstand the laser power during a welding process. The selection of the material for the fixtures may depend on the amount of force required to be generated during clamping and what localized temperatures the fixtures will experience during a laser welding operation. In some embodiments, spring features 508 may be modified to allow for a larger or smaller spring force base on the particular application of second fixture 500.

Figure 6A:
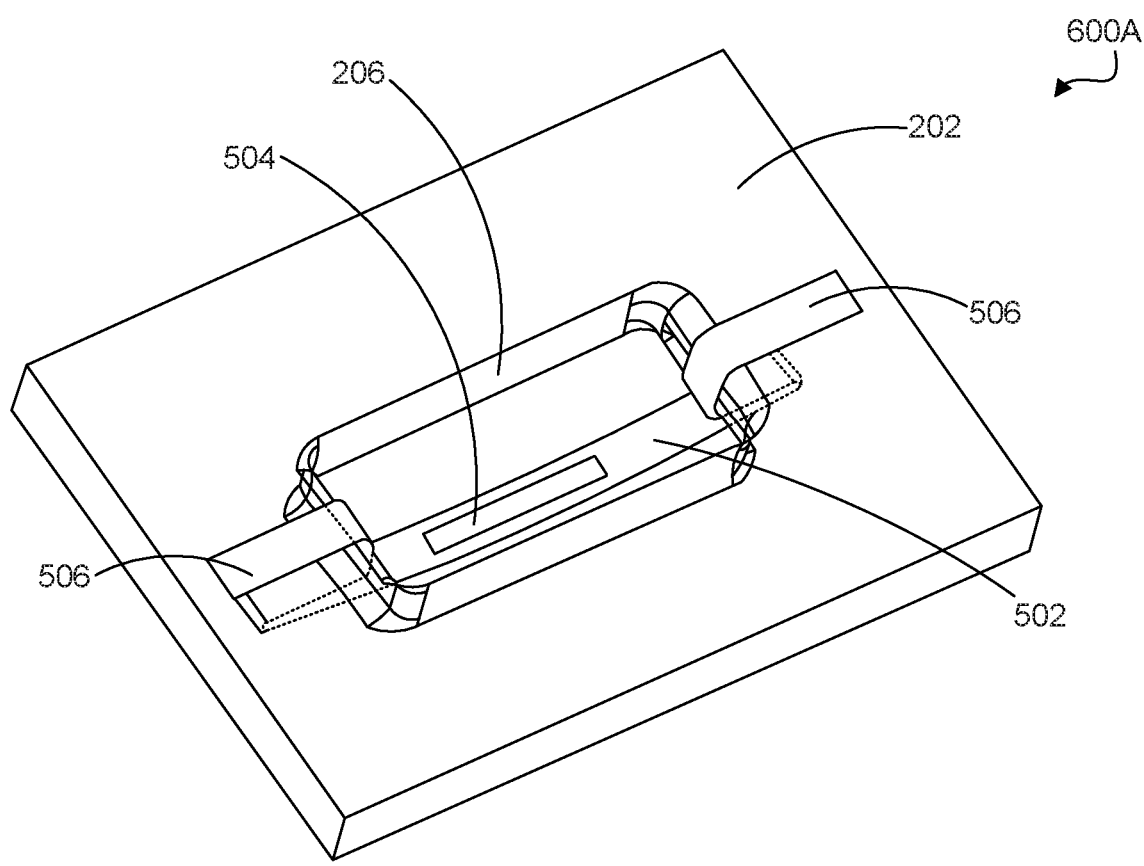
FIG. 6A is a schematic illustration of a perspective view of the exemplary second fixture engaged with one of the second structures of the exemplary rigid plate in FIG. 2A.

FIG. 6A is a schematic illustration of a perspective view 600A of exemplary second fixture 500 engaged with one of second structures 206 of rigid plate 202. As shown in FIG. 6A, first fixture 500 is installed/received in one of second structures 206 of rigid plate 202. Hold-in-place tabs 506 engage a portion of a top surface of rigid plate 202 that provides a landing surface for hold-in-place tabs 506 to engage and prevent hold-in-place tabs 506 from rotating or moving from their intended positions. Spring features 508 engage a portion of a bottom surface of rigid plate 202 that provides a landing surface for spring features 508 to engage and prevent spring features 508 from rotating or moving from their intended positions. Further, the bottom surface of rigid plate 202 may provide a space for spring features 508 to extend axially upon a push/compress force being transferred to second fixture 500 from rigid plate 202, thus pushing body 502 down on one corresponding second tab to hold the one corresponding second tab against one corresponding negative terminal of a battery cell. A laser beam may pass through aperture 504 for welding together the one corresponding second tab and the one corresponding negative terminal of the battery module while the one corresponding second tab is held against the one corresponding negative terminal of the battery module with a zero gap there between.

Figure 6B:
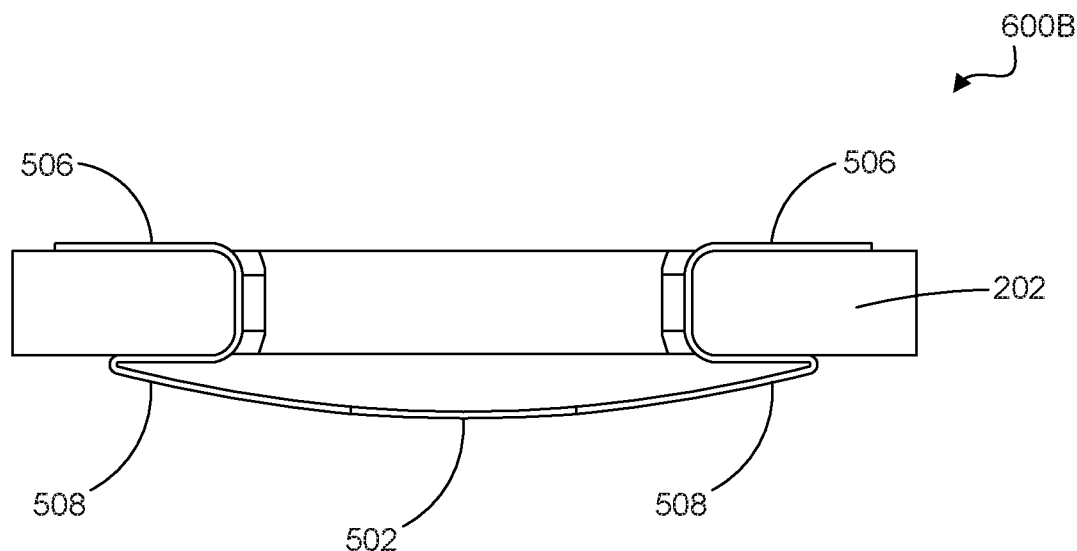
FIG. 6B is a schematic illustration of a cross-sectional view of the exemplary second fixture engaged with one of the second structures of the exemplary rigid plate in FIG. 6A.

FIG. 6B is a schematic illustration of a cross-sectional view 600B of the exemplary second fixture engaged with one of the second structures of exemplary rigid plate 202 in FIG. 6A. As illustrated in FIG. 6B, tabs 506 engage a portion of the top surface of rigid plate 202, and spring features 508 engage a portion of the bottom surface of rigid plate 202.

In this disclosure, both first fixture 300 and second fixture 500 may also be generally referred to as hold-down fixtures that hold down circuit tabs (including first tab 106 and second tab 108) against the battery cell terminals creating a zero-gap between the interface of the circuit tab and the battery terminal. Each hold-down fixture (first fixture and second fixture) may independently apply a force required to bend the fixture and hold each circuit tab in place. As mentioned previously, hold-down fixtures may be made of any suitable materials and by any suitable method or process. For example, hold-down fixtures may be 3D printed with a PA2200 material with an adhesive binder added for strength and flexibility. Additionally, individual hold down fixtures may act like a spring when a force is applied to them. When hold-down fixtures are installed or assembled in a rigid plate (e.g., one first fixture being received/housed in one first structure and one second fixture being received/housed in one second structure), the rigid plate may determine spacing and orientation of hold-down fixtures and provide a push force needed to bend the hold-down fixture and hold circuit tabs in place. Further, hold-down fixtures may be located with respect to the battery module by using alignment features of rigid plate 202 (e.g., hole and/or slot), ensuring that hold-down fixtures are aligned with the positive and negative terminals of battery cells.

Figure 7A:
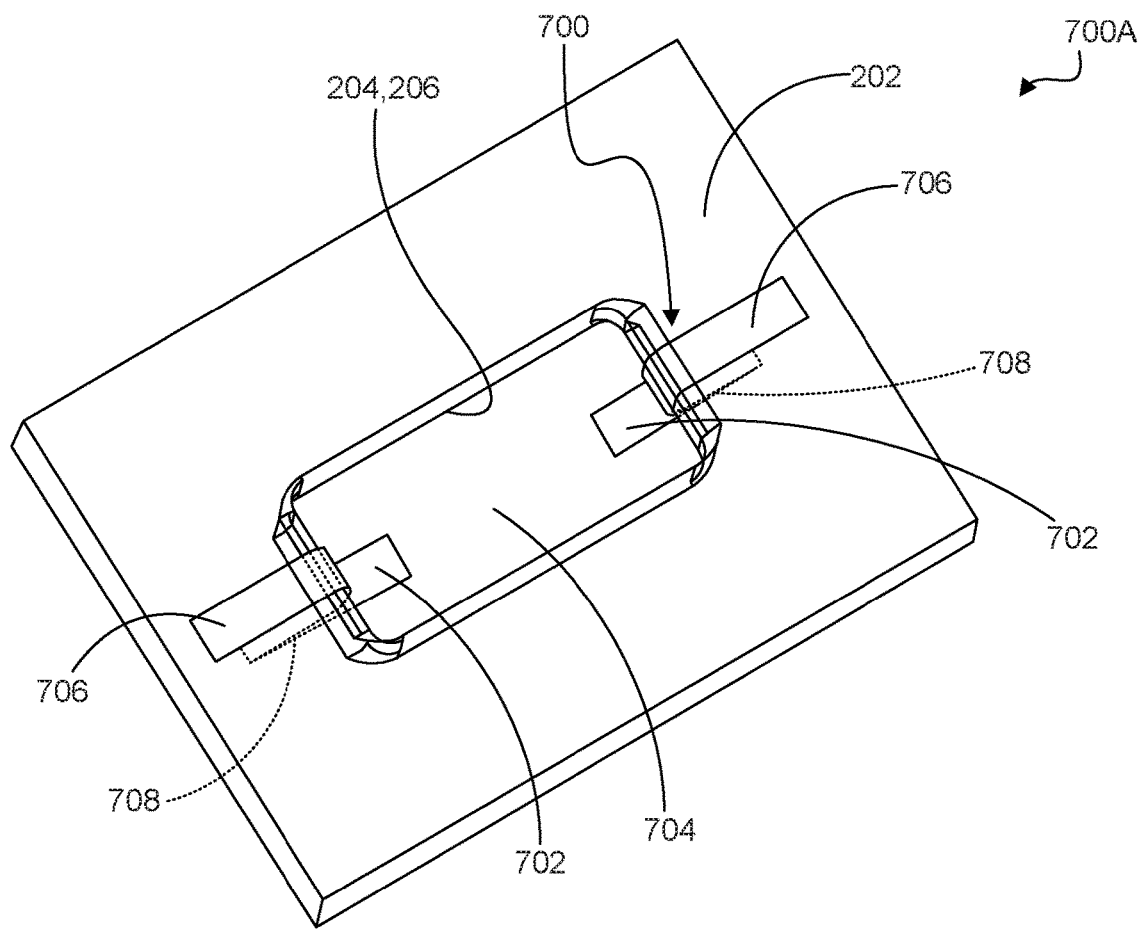
FIG. 7A is a schematic illustration of a perspective view of another exemplary first or second fixture engaged with one of the first structures or the second structures, respectively, of the exemplary rigid plate in FIG. 2A, according to an exemplary embodiment.

In some embodiments, both the first and second fixtures may be configured to be the same or similar. FIG. 7A is a schematic illustration of a perspective view 700A of another exemplary hold-down fixture (first or second fixture) that may be used with exemplary rigid plate 202 in FIG. 2A, according to an exemplary embodiment. As shown in FIG. 7A, a hold-down fixture 700 includes a body 702, a gap or aperture 704, a pair of hold-in-place tabs 706, and a pair of spring features 708 that may be a portion of body 702. Gap 704 is configured to be substantially centered in body 702 to allow a laser beam to pass through for welding first/second tab of circuit 102 to one corresponding positive/negative terminal of a battery cell in battery module 104. In some embodiments, gap 704 may be configured to have any shape and/or any size that allows the laser beam not to be blocked. Tabs 706 are configured to connect to spring features 708 and further configured to snap hold-down fixture 700 into one of first/second structures 204/206 and to hold hold-down fixture 700 in place so as not to allow hold-down fixture 700 to fall out of rigid plate 202. Spring features 708 are configured to engage rigid plate 202 and allow hold-down 700 to flex through a distance sufficient to hold first tab 106/second tab 108 in place against one corresponding positive/negative terminal of a battery cell in a battery module (e.g., battery module 102), so there is zero-gap between the tab and corresponding terminal. Further, tabs 706 may allow easy installation and removal of spring features 708. Additionally, spring features 708 may be configured to allow hold-down fixture 700 to revert to its original state.

Further as shown in FIG. 7A, hold-down fixture 700 is engaged with one of the first structures 204 or second structures 206 of the exemplary rigid plate 202. Hold-in-place tabs 706 engage a portion of a top surface of rigid plate 202 that provides a landing surface for hold-in-place tabs 706 to engage and prevent hold-in-place tabs 706 from rotating or moving from their intended positions, while spring features 708 engage a portion of a bottom surface of rigid plate 202 that provides a landing surface for spring features 708 to engage and prevent spring features 708 from rotating or moving from their intended positions. Further, the bottom surface of rigid plate 202 may provide a space for spring features 708 to extend axially upon a push/compress force being transferred to hold-down fixture 700 from rigid plate 202, thus pushing body 702 down on one corresponding first/second tab of the circuit to hold the one corresponding first/second tab against one corresponding positive/negative terminal of a battery cell. A laser beam may pass through gap 704 for welding together the one corresponding first/second tab and the one corresponding positive/negative terminal of the battery module while the one corresponding first/second tab is held against the one corresponding positive/negative terminal of the battery with a zero-gap there between.

Figure 7B:
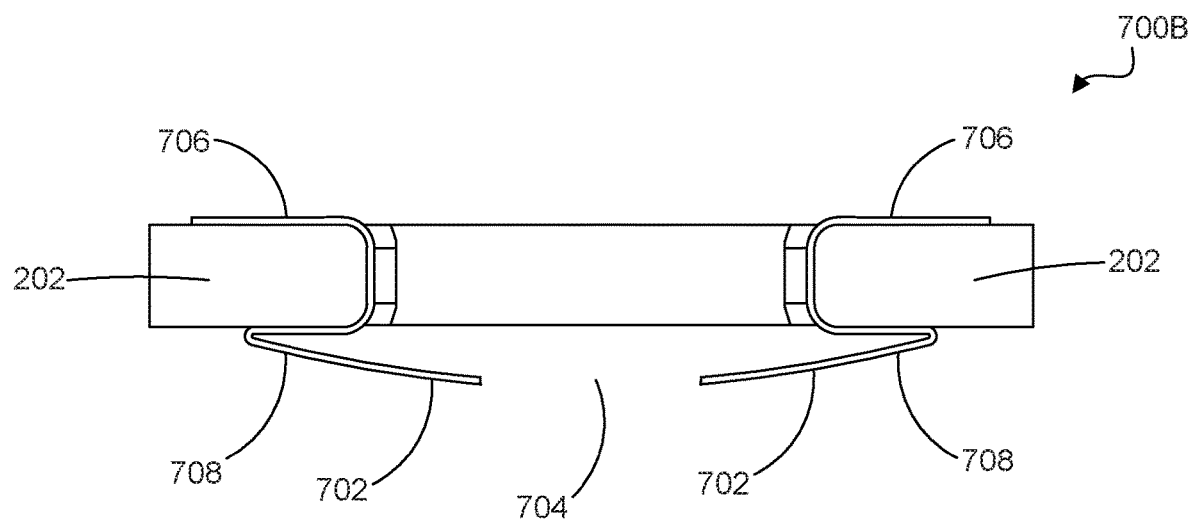
FIG. 7B is a schematic illustration of a cross-sectional view of the another exemplary first or second fixture engaged with one of the first structures or the second structures, respectively, of the exemplary rigid plate in FIG. 7A.

FIG. 7B is a schematic illustration of a cross-sectional view 700B of the exemplary hold-down fixture (first or second fixture) in FIG. 7A. As illustrated in FIG. 7B, body 702 may be configured to have a convex curved structure that contacts with one of first tabs 106 or second tabs 108 and pushes the one of first tabs 106 or second tabs 108 against one corresponding positive/negative battery terminal. The convex curved structure allows a spring action to be performed when rigid plate 202 is placed in its final clamping position. Further, the curved structure may allow flattening out of the first/second tabs of the circuit as the rigid plate comes to its final clamping position. In some embodiments, body 702 may be configured to have other structures instead of a convex curved structure, for example, a flat structure. Further as illustrated in FIG. 7B, tabs 706 engage a portion of the top surface of rigid plate 202, and spring features 708 engage a portion of the bottom surface of rigid plate 202.

Figure 8A:
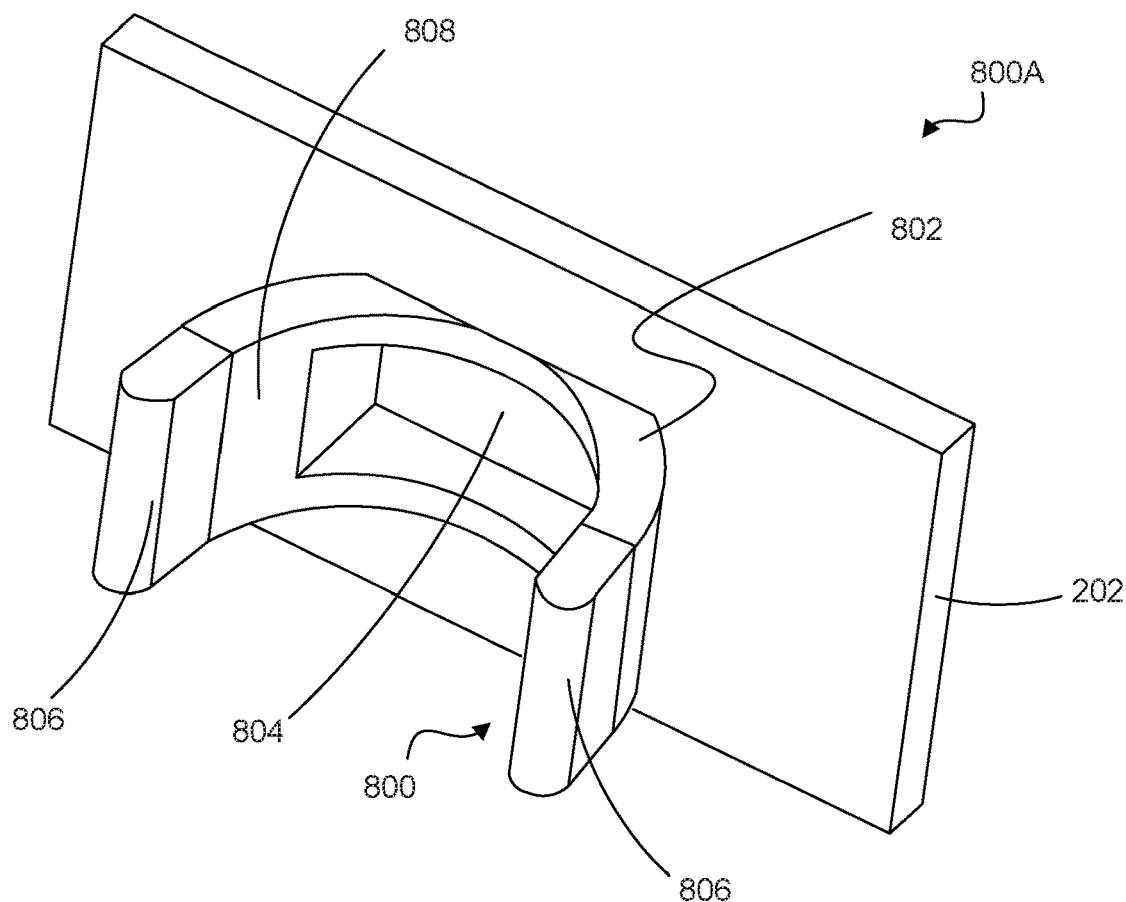
FIG. 8A is a schematic illustration of a perspective view of yet another exemplary second fixture that may be used with the exemplary rigid plate in FIG. 2A, according to an exemplary embodiment.

In some embodiments, the second fixture may be configured to perform like a spring. FIG. 8A is a schematic illustration of a perspective view 800A of yet another exemplary second fixture that may be used with exemplary rigid plate 202 in FIG. 2A, according to an exemplary embodiment. As shown in FIG. 8A, second fixture 800 includes a body 802, an aperture 804, a pair of hold-down tabs 806, and a pair of spring features 808 that may be a portion of body 802 and positioned above the pair of hold-down tabs 806, respectively. Body 802 may be configured to snap into one of second structures 206 and to hold second fixture 800 in place to not allow second fixture 800 to fall out of rigid plate 202. Aperture 804 is configured to be substantially centered in body 802 to allow a laser beam to pass through for welding second tab of circuit 102 to one corresponding negative terminal of a battery cell in battery module 104. In some embodiments, aperture 804 may be configured to have any shape and/or any size that allows the laser beam not to be blocked. Tabs 806 may be configured to connect to spring features 808. Spring features 808 are configured to engage rigid plate 202 and allow second fixture 800 to flex through a distance sufficient to exert a force on and hold second tab 108 in place against one corresponding negative terminal of a battery cell in a battery module (e.g., battery module 102), so there is a zero-gap between second tab 108 and the corresponding negative terminal. Further, tabs 806 may allow easy installation and removal of spring features 808. Additionally, spring features 808 may be configured to allow second fixture 800 to revert to its original state. Further, as shown in FIG. 8A, second fixture 800 is installed in one of second structure 206 of rigid plate 202.

Figure 8B:
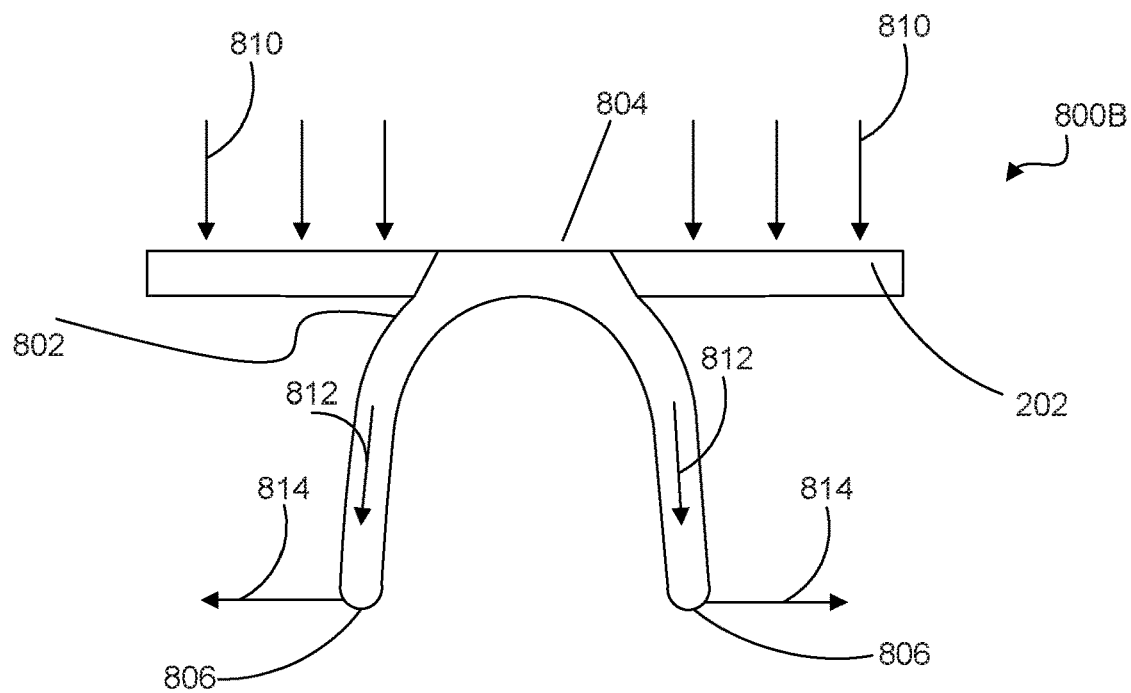
FIG. 8B is a schematic illustration of a cross-sectional view of the another exemplary second fixture in FIG. 8A.

FIG. 8B is a schematic illustration of a cross-sectional view 800B of the another exemplary second fixture in FIG. 8A. As shown in FIG. 8B, a uniform or non-uniform load may be applied to rigid plate 202, indicated by arrows 810. As the load/force is transferred through hold-down tabs 806 (as indicated by arrows 812), tabs 806 laterally move in the opposite direction from each other, as indicated by arrows 814. This opposite-direction motion may perform two operations: one operation is to smooth out the second flex tabs (e.g., second tabs 108) starting from the center out and/or to stretch the circuit material causing it to be in a flat state; the other operation is to hold the second flex tab flat against the battery cell negative terminal creating a zero-gap there between.

Figure 9:
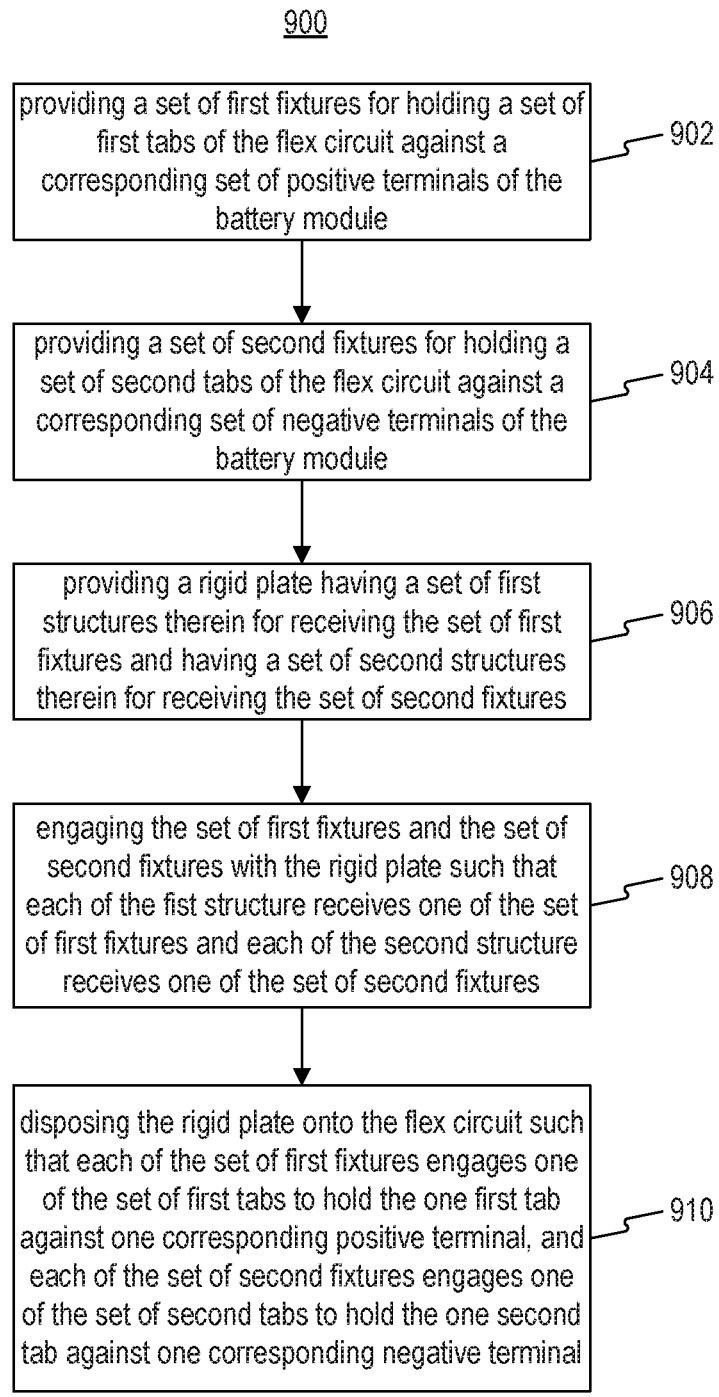
FIG. 9 is a flowchart illustrating an exemplary method for holding a circuit against a battery module, according to an exemplary embodiment.

FIG. 9 is a flowchart illustrating an exemplary method 900 of using a rigid plate and hold-down fixtures for holding circuit 102 against battery module 104, according to an exemplary embodiment of the disclosure.

Step 902 includes providing a set of first fixtures for holding a set of first tabs of the circuit against a corresponding set of positive terminals of the battery module. For example, the set of first fixture may be a set of first fixtures 300.

Step 904 includes providing a set of second fixtures for holding a set of second tabs of the circuit against a corresponding set of negative terminals of the battery module. For example, the set of second fixture may be a set of second fixtures 500.

Step 906 includes providing a rigid plate having openings, including a set of first structures for receiving the set of first fixtures and a set of second structures therein for receiving the set of second fixtures. For example, the rigid plate may be rigid plate 202, the set of first structure may be the set of first structures 204, and the set of second structure may be the set of second structure 206.

Step 908 includes engaging the set of first fixtures and the set of second fixtures with the rigid plate such that each of the first structures receives one of the set of first fixtures and each of the second structures receives one of the set of second fixtures. For example, the set of first fixtures 300 and the set of second fixtures 500 may be installed into the set of first structures 204 and the set of second structures 206, as illustrated in FIGS. 4A and 6A, respectively.

Step 910 may include disposing the rigid plate onto the circuit such that each of the set of first fixtures engages one of the set of first tabs to hold the one first tab against one corresponding positive terminal, and each of the set of second fixtures engages one of the set of second tabs to hold the one second tab against one corresponding negative terminal. For example, upon positioning rigid plate 202 onto circuit 102, the set of first fixtures 300 and the set of second fixtures 500 may push the set of first tabs 106 and the set of second tabs 108 against the corresponding positive and negative terminals of battery cells in battery module 104, thus holding the flex tabs against the battery terminals with a zero-gap between them so they can be welded together by a laser beam passing through apertures of hold-down fixtures.

In some embodiments, the method may further include providing at least one or more of holes or slots in rigid plate 202 to align the set of first fixtures and the set of second fixtures with the set of positive terminals and the set of negative terminals of the battery module, respectively. For example, hole or slot 208 may be used to align the hold-down fixtures with the corresponding battery terminals of battery module 104.

In some embodiments, the method may further include providing, by the rigid plate, a force to the set of first fixtures and the set of second fixture to hold the set of first tabs and the set of second tabs of the circuit against the set of positive terminals and the set of negative terminals of the battery module, respectively. Fox example, a pushing or compressive force may be applied to rigid plate 202, then the pushing or compressive force is transferred to the hold-down fixtures from rigid plate 202.

In some embodiments, the method may further include forming the set of first fixtures and the set of second fixture of an elastic material that withstands a temperature at least as high as a predetermined temperature.

In some embodiments, the method may further include providing each of the first fixtures with an aperture positioned substantially in the center of the first fixture, the aperture being intended for passing a laser beam for welding each of the first tabs with one corresponding positive terminal of a battery cell in a battery module.

In some embodiments, the method may further include providing each of the second fixtures with an aperture positioned substantially in the center of the second fixture, the aperture being intended for passing a laser beam to pass for welding each of the second tabs with one corresponding negative terminal of a battery cell in a battery module.

It will be apparent to those skilled in the art that various modifications and variations can be made to the disclosed apparatus and methods. Other embodiments will be apparent to those skilled in the art from consideration of the specification and practice of the disclosed apparatus and related methods. It is intended that the specification and examples be considered as exemplary only, with a true scope being indicated by the following claims and their equivalents.

What is claimed is:

1. An apparatus for holding a circuit against a battery module, the apparatus comprising:
   a set of first fixtures for holding a set of first conductive tabs of the circuit against a corresponding set of positive terminals of the battery module, wherein each of the first fixtures includes an aperture positioned substantially in a center of the first fixture, the aperture for passing a laser beam for welding each of the first tabs with one corresponding positive terminal of the battery module;
   a set of second fixtures for holding a set of second conductive tabs of the circuit against a corresponding set of negative terminals of the battery module; and
   a rigid plate having openings therein for receiving the set of first fixtures and the set of second fixtures, and the rigid plate configured for mounting to a structure holding the battery module;
   wherein each of the first fixtures further includes:
      a body having the aperture therein, a pair of spring features connected to the body at each end thereof, and a pair of hold-in-place tabs connected to the pair of spring features respectively, the body further having a convex curved structure that includes the pair of spring features; or
      a body having a pair of separate convex curved structures to form the aperture therebetween, a pair of spring features connected to the body at each end thereof, and a pair of hold-in-place tabs connected to the pair of spring features respectively; or
      a body having a pair of separate flat structures to form the aperture therebetween, and a pair of hold-in-place tabs connected to the body at each end thereof.

2. The apparatus of claim 1, wherein the rigid plate further includes at least one of holes or slots for aligning the set of first fixtures and the set of second fixtures with the set of positive terminals and the set of negative terminals of the battery module, respectively.

3. The apparatus of claim 1, wherein the rigid plate provides a force to the set of first fixtures and the set of second fixtures to hold the set of first tabs and the set of second tabs of the circuit against the set of positive terminals and the set of negative terminals of the battery module, respectively.

4. The apparatus of claim 1, wherein the set of first fixtures and the set of second fixtures are formed of an elastic material that withstands a temperature at least as high as a predetermined temperature.

5. The apparatus of claim 1, wherein each of the first fixtures includes the body having the aperture therein, the pair of spring features connected to the body at each end thereof, and the pair of hold-in-place tabs connected to the pair of spring features respectively, the body further having the convex curved structure that includes the pair of spring features.

6. The apparatus of claim 5, wherein:
   the pair of hold-in-place tabs are configured to position the first fixture into one corresponding opening of the rigid plate and engage a portion of a top surface of the rigid plate; and
   the pair of spring features are configured to engage a portion of a bottom surface of the rigid plate.

7. The apparatus of claim 1, wherein each of the first fixtures includes the body having the pair of separate convex curved structures to form the aperture therebetween, the pair of spring features connected to the body at each end thereof, and the pair of hold-in-place tabs connected to the pair of spring features respectively.

8. The apparatus of claim 7, wherein:
the pair of hold-in-place tabs are configured to position the first fixture into one corresponding opening of the rigid plate and engage a portion of a top surface of the rigid plate; and
the pair of spring features are configured to engage a portion of a bottom surface of the rigid plate.

9. The apparatus of claim 1, wherein each of the first fixtures includes the body having the pair of separate flat structures to form the aperture there between, and the pair of hold-in-place tabs connected to the body at each end thereof.

10. The apparatus of claim 1, wherein each of the second fixtures includes a second aperture positioned substantially in a center of the second fixture, the second aperture for passing a laser beam for welding each of the second tabs with one corresponding negative terminal of the battery module.

11. An apparatus for holding a circuit against a battery module, the apparatus comprising:
a set of first fixtures for holding a set of first conductive tabs of the circuit against a corresponding set of positive terminals of the battery module;
a set of second fixtures for holding a set of second conductive tabs of the circuit against a corresponding set of negative terminals of the battery module, wherein each of the second fixtures includes an aperture positioned substantially in a center of the second fixture, the aperture for passing a laser beam for welding each of the second tabs with one corresponding negative terminal of the battery module; and
a rigid plate having openings therein for receiving the set of first fixtures and the set of second fixtures, and the rigid plate configured for mounting to a structure holding the battery module;
wherein each of the second fixtures further includes:
a body having the aperture therein, a pair of spring features connected to the body at each end thereof, and a pair of hold-in-place tabs connected to the pair of spring features respectively, the body further having a convex curved structure that includes the pair of spring features; or
a body having a pair of separate convex curved structures to form the aperture therebetween, a pair of spring features connected to the body at each end thereof, and a pair of hold-in-place tabs connected to the pair of spring features respectively; or
a body having a pair of separate flat structures to form the aperture therebetween, and a pair of hold-in-place tabs connected to the body at each end thereof; or
a body, a pair of hold-down tabs connected to the body at each end thereof, and a pair of spring features that are a portion of the body and positioned above the pair of hold-down tabs respectively, wherein upon receiving a force, the pair of hold-down tabs move in opposite directions from each other such that one corresponding second tab of the circuit is smoothed out from the center thereof and the corresponding second tab is held against one corresponding negative terminal of a battery to create a zero-gap therebetween.

12. The apparatus of claim 11, wherein each of the second fixtures includes the body having the aperture therein, the pair of spring features connected to the body at each end thereof, and the pair of hold-in-place tabs connected to the pair of spring features respectively, the body further having the convex curved structure that includes the pair of spring features.

13. The apparatus of claim 12, wherein the pair of hold-in-place tabs are configured to position the second fixture into one corresponding opening of the rigid plate and engage a portion of a top surface of the rigid plate; and
the pair of spring features are configured to engage a portion of a bottom surface of the rigid plate.

14. The apparatus of claim 13, wherein each of the second fixtures includes a body having a pair of separate convex curved structures to form the aperture therebetween, a pair of spring features connected to the body at each end thereof, and a pair of hold-in-place tabs connected to the pair of spring features respectively.

15. The apparatus of claim 14, wherein:
the pair of hold-in-place tabs are configured to position the second fixture into one corresponding opening in the rigid plate and engage a portion of a top surface of the rigid plate; and
the pair of spring features are configured to engage a portion of a bottom surface of the rigid plate.

16. The apparatus of claim 11, wherein each of the second fixtures further includes the body having the pair of separate flat structures to form the aperture therebetween, and the pair of hold-in-place tabs connected to the body at each end thereof.

17. The apparatus of claim 11, wherein:
each of the second fixtures further includes the body, the pair of hold-down tabs connected to the body at each end thereof, and the pair of spring features that are the portion of the body and positioned above the pair of hold-down tabs respectively.

* * * * *

UNITED STATES PATENT AND TRADEMARK OFFICE
CERTIFICATE OF CORRECTION

PATENT NO. : 11,088,411 B2  
APPLICATION NO. : 15/942314  
DATED : August 10, 2021  
INVENTOR(S) : Hrayr Torosyan It is certified that error appears in the above-identified patent and that said Letters Patent is hereby corrected as shown below:

In the Specification

Column 4, Line 39, delete "type" and insert --type li-ion--.

In the Claims

Column 14, Claim 14, Line 28, delete "13," and insert --11,--.

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*